United States Patent [19]
Nestler et al.

[11] Patent Number: 4,799,055
[45] Date of Patent: Jan. 17, 1989

[54] OPTICAL MOUSE

[75] Inventors: Eric Nestler, Acton; Thomas F. Knight, Belmont, both of Mass.

[73] Assignee: Symbolics Inc., Cambridge, Mass.

[21] Appl. No.: 604,111

[22] Filed: Apr. 26, 1984

[51] Int. Cl.⁴ ............................................. G09G 3/02
[52] U.S. Cl. ................................... 340/710; 340/709; 250/221; 250/578
[58] Field of Search ............... 340/710, 707, 709, 706; 178/18, 19, 20; 250/221, 578

[56] References Cited

U.S. PATENT DOCUMENTS

| | | |
|---|---|---|
| 3,541,521 | 11/1970 | Koster . |
| 3,541,541 | 11/1970 | Engelbart . |
| 3,656,154 | 4/1972 | Ross et al. . |
| 3,835,464 | 9/1974 | Rider . |
| 3,892,963 | 7/1975 | Hawley et al. . |
| 3,987,685 | 10/1976 | Opocensky . |
| 4,303,914 | 12/1981 | Page . |
| 4,364,035 | 12/1982 | Kirsch . |
| 4,369,439 | 1/1983 | Broos . |
| 4,390,873 | 6/1983 | Kirsch . |
| 4,521,773 | 6/1985 | Lyon ................................... 340/794 |
| 4,531,230 | 7/1985 | Brogardh ............................ 178/18 |
| 4,546,347 | 10/1985 | Kirsch ................................. 346/707 |
| 4,550,250 | 10/1985 | Mueller et al. ..................... 340/710 |
| 4,550,316 | 10/1985 | Whetstone et al. ................ 340/710 |
| 4,631,400 | 9/1987 | Tanner et al. ...................... 346/710 |
| 4,751,380 | 6/1988 | Victor et al. ....................... 250/221 |

FOREIGN PATENT DOCUMENTS 0081348 12/1981 European Pat. Off. .
0076032 6/1983 European Pat. Off. .

OTHER PUBLICATIONS

"Mouse Tracks Path by Electronics Only" Electronics International vol. 55 (1982) Oct., No. 21, New York, USA.

Lyon, Richard F., "The Optical Mouse, And An Architectural Methodology For Smart Digital Sensors", VLSI-81-1, Aug. 1981.

Primary Examiner—John W. Caldwell, Sr.
Assistant Examiner—Tyrone Queen
Attorney, Agent, or Firm—Sprung, Horn, Kramer & Woods

[57] ABSTRACT

A method and device for converting movement of an optical mouse on a surface having any random surface pattern of relatively light and dark areas separated by edges to electrical signals representing a direction of motion relative to two non-parallel axes. A plurality of prechargeable photon sensors are disposed on the mouse in a row along each axis and facing the surface periodically. The presence of an edge is periodically sensed in at least one preselected portion of each row of sensors, defining a sensor state for each axis for each period upon the sensing of an absence of an edge. Successive sensor states are compared to determine if movement has occurred relative to each axis and a signal representative of the movement determined is produced.

17 Claims, 7 Drawing Sheets

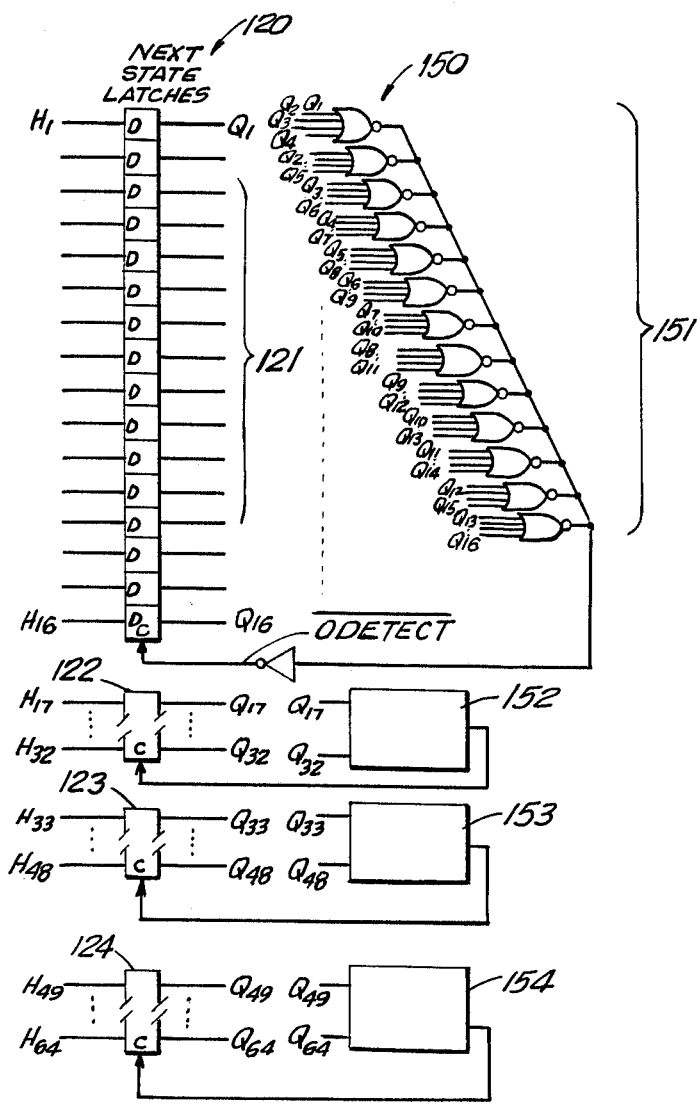
FIG.3
FIG.4
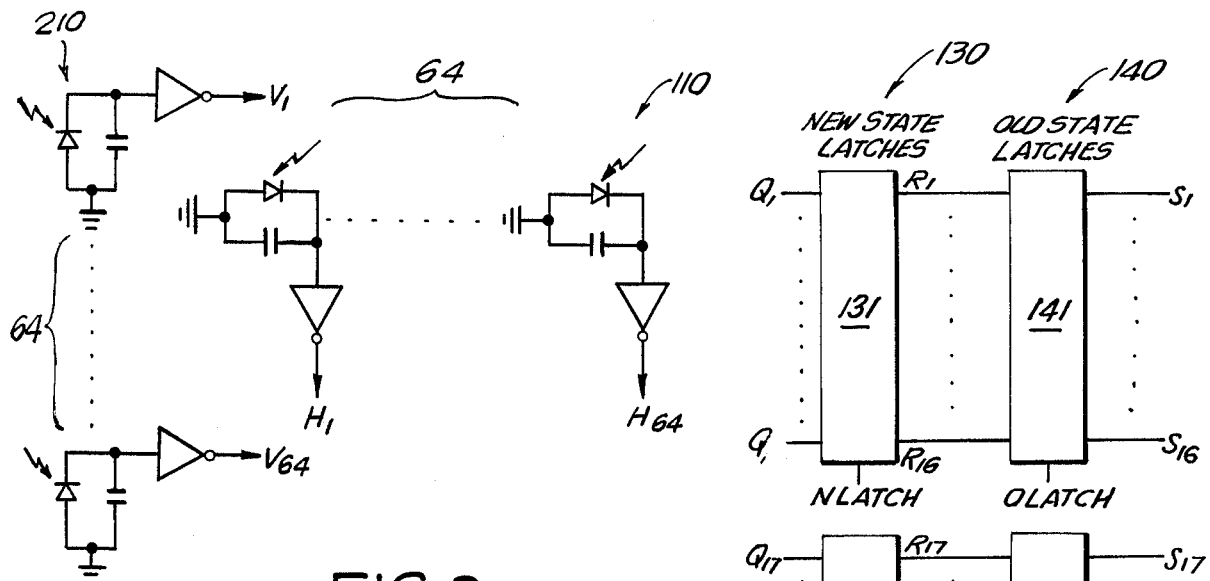
FIG.5

OPTICAL MOUSE

BACKGROUND OF THE INVENTION

The present invention relates generally to a device for controlling the position of a visual display cursor and further to a method for converting the movement of an object on a surface to electrical signals, and moe particularly, to what is now commonly known as an optical mouse.

A mechanical mouse for user as a peripheral device for the control of a cursor for a visual display in a computer system is well known in the art. Examples of mouse devices known in the prior art can be found in U.S. Pat. Nos. 3,541,521; 3,541,541; 3,835,464; 3,892,963; 3,987,685; 4,303,914; and 4,369,439.

While these devices are useful to aid in the control of a display cursor in response to the movement of a user's hand as the user pushes the mechanical mouse on a pad or a work surface next to the user keyboard, these devices have many disadvantages. Firstly, because they rely on the mechanical movement of a ball or a wheel, they are not particularly reliable because they use many moving parts. A mechanical mouse relies on the rolling action of a ball or wheel on a surface and if the balls or wheels get dirty, they slip on the work surface rather than roll. Moreover, because of the moving parts necessary in the mechanical mouse device, it is relatively expensive compared to the electronics that is contained therein.

In order to overcome the disadvantages of the electromechanical mouse disclosed in the aforementioned prior art patents, an electro-optical mouse has been proposed. Examples of an electro-optical mouse can be found in U.S. Pat. Nos. 4,364,035 and 4,390,873. Another optical mouse has been extensively described in "The Optical Mouse, And An Architectural Methodology For Smart Digital Sensors" Richard F. Lyon, VLSI-81-1 August 1981.

While the optical mouse devices described in the aforementioned two patents and the Lyon article are improvements over the aforementioned mechanical mouse devices, these optical mouse devices disadvantageously require a work surface or pad, which has a defined or predetermined pattern of light and dark areas or colors, in order to operate. The optical mouse then senses the pattern and is able to produce signals representative of the movement of the device relative to the pattern.

The Lyon device, is particularly pattern sensitive, which means, that the internal processing algorithms therein for determining movement, have been defined for the particular predetermined pattern that the optical mouse is to be moved upon and it will only work efficiently on this patterned surface.

While these optical mouse devices are inherently more reliable than electromechanical mouse devices, they have the disadvantage of being pattern sensitive and being operable only on particular patterns that must be located near the workstation keyboard. If these patterns get dirty or otherwise have irregularities in them, the optical mouse devices will not operate efficiently or effectively. Moreover, if for some reason the patterned surface is unavailable to the user, the optical device will become inoperable.

SUMMARY OF THE INVENTION

The main object of the present invention is to provide an electro-optical mouse which is pattern insensitive, i.e., can operate on virtually any substantially planar imperfect surface, especially those having a random surface pattern relatively light and dark areas separated by edges, for example a wood grained surface or any surface that is not completely monochromatic with no image imperfections thereon.

Another object of the present invention is to provide a method of converting the movement of an object on such a surface to electrical signals which represent a direction of motion relative to two nonparallel axes.

These and other objects of the present invention are achieved in accordance with the present invention by a device for controlling the position of a visual display cursor, wherein the device is movable on a surface having a pattern of relatively light and dark areas separated by edges and optically senses the motion of the device on the surface relative to two non-parallel axes to produce signals representing a direction of motion for the cursor, and comprises: means for optically sensing motion on any random surface pattern with edges comprising a plurality of prechargeable photon sensors disposed in an row along each axis, means for periodically sensing the presence of an edge in at least one preselected portion of each row of sensors to define a sensor state for each axis for each period and means for comparing successive sensor states for each axis to determine if movement has occurred relative to each axis. The means for periodically sensing comprises means for precharging the sensors every period, and first latching means for each axis for storing the output of the sensors upon the sensing of the presence of an edge to define the next state of the sensors. The comparing means for each axis comprises second latching means for storing a "new" state corresponding to the last state of the sensors, third latching means for storing an old state of the sensors, means receptive of the new state and the old state for determining if movement has occurred, means for entering the new state from the second latching means into the third latching means in each period upon the determination of movement and for entering the next state from the first latching means into the second latching means in each period.

The optical sensing means comprises, N prechargeable photon sensors for each axis, where N is preferably 64 or 96, and means for digitizing the output of each sensor, i.e. a Schmidt trigger. The first latching means comprises N first latches, and the means for sensing the presence of an edge comprises means receptive of the outputs of the sensors in P groups of Q outputs, wherein $P \times Q = N$ and preferably $P=4$ and $Q=16$, means for producing a group latch signal for each group when the first set of outputs of any R adjacent sensors in that group indicate that the sensors have discharged below a given threshold and where $R<Q$ and R is preferably 4 or 5 and means for applying the group latch signal to the group of Q first latches associated therewith in the first latching means to store the next state data that is at the inputs thereof.

The means for producing the group latch signal comprises $(Q<R+1)$ NOR-gates each having R inputs, preferably thirteen 4-input NOR gates, and wherein all of the inputs of the NOR gates are OR'ed together and wherein the latches of the first latching means comprise D-type flip-flops.

The second and third latching means comprise N latches in P groups of Q each, with each group corresponding the groups of the first latching means and wherein the means for determining if movement has occurred comprises means for scanning each corresponding set of S adjacent outputs in each group of Q latches of the second and third latching means, while S is preferably 4, and means for analyzing each scan in accordance with a predetermined algorithm. The analyzing means preferably comprises a programmed logic array having the algorithm stored therein.

The device also comprises means for producing a direction signal comprising, for each axis, three up/down counters including a first counter for movement in one direction, a second counter for movement in another direction opposite said one direction and a third counter for no movement, means for up-counting one of the three counters for each scan upon the favorable determination of movement in that direction by the algorithm and for down counting the other two counters and means for producing a direction signal corresponding to the counter having the highest count.

The housing for the optical sensing means preferably has a base disposable on the surface including an imaging aperture, the optical sensing means comprises an integrated circuit having the photon sensors thereon and means mounting the integrated circuit in a direct path with the imaging aperture. A compound lens or a fiber optic bundle are preferably disposed between the imaging aperture and the integrated circuit.

The objects of the invention are also achieved by a method for converting movement of an object on a surface having any random surface pattern of relatively light and dark areas separated by edges to electrical signals representing a direction of motion relative to two non-parallel axes. The method comprises disposing a plurality of prechargeable photon sensors on the object in an row along each axis and facing the surface, periodically sensing the presence of an edge in at least one preselected portion of each row of sensors, defining a sensor state for each axis for each period upon the sensing of an presence of an edge, comparing successive sensor states to determine if movement has occurred relative to each axis and producing a signal representative of the movement determined.

The step of periodically sensing comprises precharging the sensors every period, latching the output of the sensors for each axis upon the sensing of the presence of an edge to define the next state of the sensors and wherein the step of comparing comprises latching the new state of the sensors for each axis, latching an old state of the sensors, scanning the latched new state and the latched old state to determine if movement has occurred, entering the new state into the old state latch in each period upon the determination of movement and entering the next state into the new state latch in each period.

The step of sensing comprising providing a N prechargeable photon sensors for each axis, digitizing the output of each sensor, providing N next state latches, dividing the outputs of the sensors in each axis into P groups of Q outputs, wherein P×Q=N, producing a group latch signal for each group when the first set of outputs of any R adjacent sensors in that group indicate that the sensors have discharged below a given threshold where R<Q, and applying the group latch signal to the group of Q next state latches associated therewith to store the next state data that is at the inputs thereof.

The step of producing the group latch signal comprises logically NORing each set of R adjacent outputs in each group in parallel and logically ORing the outputs thereof.

The step of scanning comprises scanning each corresponding set of S adjacent outputs in each group of Q latches of the new state and old state latches and analyzing each scan in accordance with a predetermined algorithm. Valid initial states are all binary states that do not have imbedded zeroes (white areas). The sensor states are latched by a 3-wide white region within a group of 16 sensors, so theoretically no double or single wide zeroes can occur. This allows some insensitivity to noise.

Filling of the state after shifting right/left in determined by the bit at the ends of the 4-bit window (1000 would have 1 fill for shift right and 0 fill for shift left). This type of filling is assuming that the objects (either white or dark, in this case) are always wider than the window, by at least one bit. Other types of fill are possible, but most require many more product terms in the pla without a large gain in movement detection.

These are the only states that can move. All other states not detected inhibit counting of any of the movement counters (up, down, stable).

0000
1111
1110
1100
1000
0111
0011
0001
0100
1001
0010
1110

The 0 of the state (in above represents a white area on surface (discharged sensor). The above initial states are allowing noisy white objects to be tracked, see about 0100 state, for example, has one dark bit as noise, but one still wants to see it as moving if next state is 0010.

The step of producing a movement signal comprises providing three up/down counters for each axis including a first counter for movement in one direction, a second counter for movement in another direction opposite said one direction and a third counter for no movement, up-counting one of the three counters for each scan upon the favorable determination of movement in that direction and down counting the other two counters and means for producing a direction signal for each axis corresponding to the counter having the highest count.

In accordance with the means and method in accordance with the present invention that many advantages are obtained therefrom. The sensor data flow from both the vertical sensors and the horizontal sensors, is pipelined with two states so that the current sensor states are being digitized and latched while the previous sensor states are being scanning and reduced to direction signals.

The sensors are diffusion area. Light which penetrates the region defining the sensors collides within the depletion region and creates electron-hole pairs. Because of the electric field present, the charges separate and become photon generated current at the external depletion region terminals. The sensor analog value is converted to a digital value by a unidirectional Schmidt trigger that is preset during the precharge cycle and the Schmidt trigger is part of the signal condition and inverter.

As a result of the novel and unique object detect circuitry used in the present invention, the fact that 5 individual sensors have different discharge rates and various ones of the Schmidt triggers have different thresholds, has a negligible effect the accuracy and efficiency of the mouse. This is because the 64 sensors for each direction are divided into four groups of 16 sensors and each of these groups is independent of the others and has associated with it 13 columns of 4 input NOR gates. Each input is an adjacent sensor latch output. The first group of four contiguous sensors that have dropped in voltage enough to switch the state of the appropriate NOR gate will shut off the input gates of the latches and cause the sensor states to be latched for the major cycle or period. The four sensor group is the minimum object size that the mouse will follow and this is between 0.2 and 0.4 mm, depending on the optical reduction that is used, although the minimum movement size will remain at one sensor width which is between 0.05 and 0.1 mm.

These and other objects and advantages of the present invention will be more clearly understood with regard to the following disclosure of a preferred embodiment of the invention along with the attached drawings wherein:

BRIEF DESCRIPTION OF THE DRAWINGS

FIG. 3 is a block diagram of the optical sensors and related circuitry of FIG. 2;

FIG. 4 is a schematic of the next state latches and object detect circuitry of FIG. 2;

FIG. 5 is a schematic of the new state latches and old state latches of FIG. 2;

DETAILED DESCRIPTION OF THE INVENTION

Figure 1A:
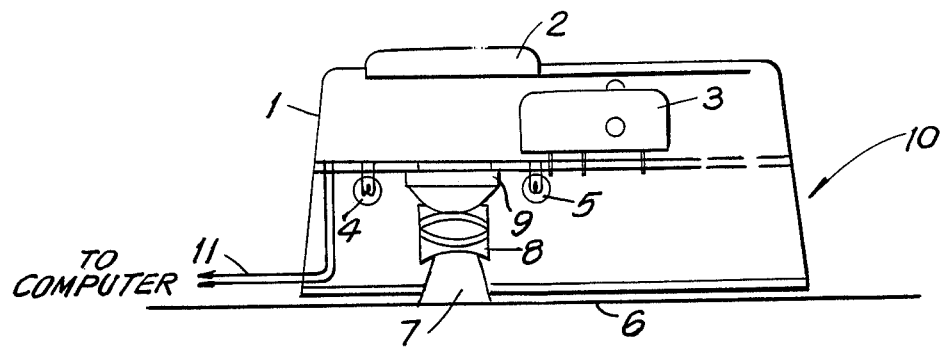
FIGS. 1A and 1B are schematic representations of the internal construction of two embodiments of the optical mouse according to the present invention.
Figure 1B:
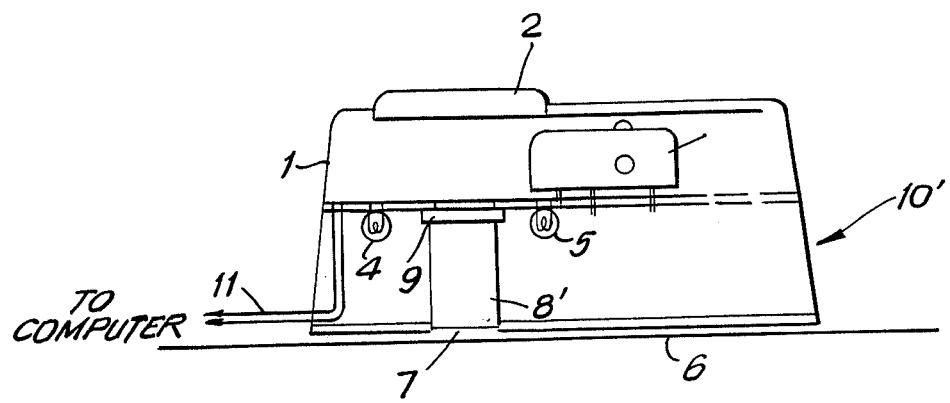

FIGS. 1A and 1B show alternative schematic representations of the electro-optical mouse according to the present invention. Device 10 shown in FIG. 1A includes a housing 1 having an aperture 7 at the bottom thereof which faces planar work surface 6 during use. Disposed in alignment with aperture 7 is optics 8 which receives light reflected from the surface 6 from light sources, 4, 5 onto photoelectric sensors and electronic processing circuitry on integrated circuit substrate 9. The device 10 also includes the at least one conventional pushbutton 2 and its associated mechanical microswitch 3. The signals generated by the processing circuitry on circuitry 9 are fed via cable 11 to a computer (not shown).

In the embodiment shown in FIG. 1B, mouse 10' is otherwise identical to that of FIG. 1a, with the exception that the optics 8 is replaced by a fiberoptic bundle 8'.

The optics 8 may also include a mirror or other elements for imaging the surface onto the sensors.

Figure 2:
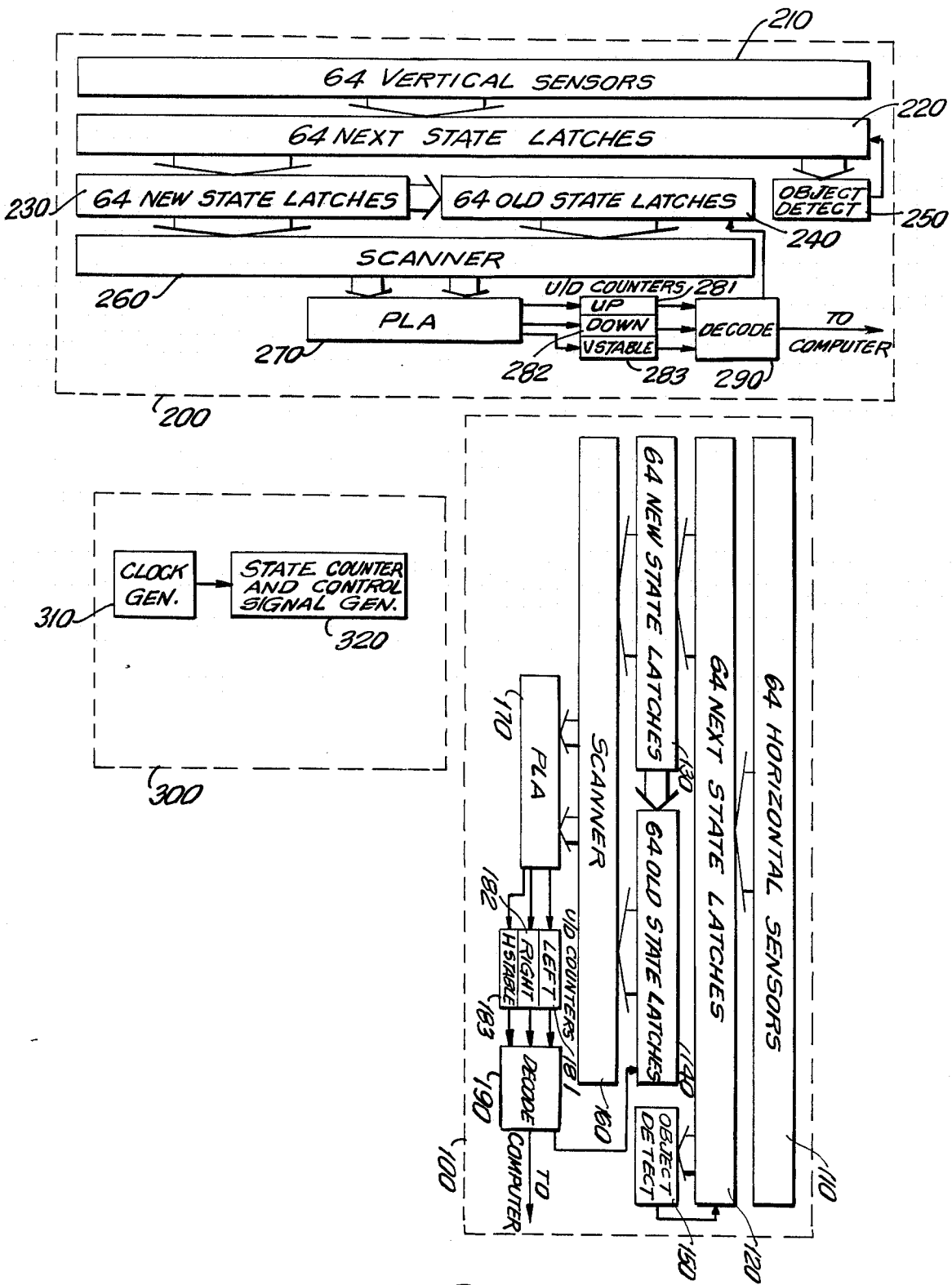
FIG. 2 is a block diagram of the circuitry in the mouse according to the present invention.

A block diagram of the circuitry contained on integrated circuit substrate 9 is shown in FIG. 2, which will now be explained in detail.

Integrated circuitry on substrate 9 is divided into three sections, block 100 for sensing movement along a horizontal axis, block 200 for sensing movement along a vertical axis and block 300 for generating timing and control signals. Blocks 100 and 200 are virtually identical in their construction and operation, with the only difference being in the physical orientation thereof as shown. While the mouse according to the present invention can be implemented to sense movement along two nonorthogonal axes, the preferred embodiment according to the present invention is the sensing of movement relative to two axes disposed at 90°.

The optical sensing is carried out by 64 horizontal sensors 110 and 64 vertical sensors 210. The sensors are approximately 50 um by 150 um and are implemented by NMOS integrated circuit technology. A description of the implementation thereof is found in the aforecited article by Richard F. Lyon and is incorporated by reference herein. The article also describes the mode of operation thereof upon precharging.

The sensors 110, 210 operate by being periodically precharged to a high state whereupon, if they are irradiated by photons, will discharge to a low state indicating a logic 0 output below a predetermined threshold.

The outputs of the sensors and their associated signal conditions and inverters are applied to the 64 Next State Latches 120, 220. The outputs of the Next State Latches 120, 220 are applied simultaneously to 64 New State Latches 130, 230 and object detecting circuitry 150, 250. The outputs of the New State Latches 130, 230 are applied to 64 Old State Latches 140, 240. Scanning circuitry 160, 260 for comparing the old state and the new state for the determination of movement, is receptive of the outputs of the 64 New State Latches 130, 230 and the outputs of the 64 Old State Latches 140, 240. The output of the scanner 160, 260 is applied to a programmed logic array (PLA) 170, 270 having an algorithm therein for determining movement on the basis of the comparison of the states of the New State Latches and the Old State Latches. The outputs of the PLA's 170, 270 are fed to up-down counters 181, 182, 183 and 281, 282, 283 for determining on the one hand left, right and horizontally stable movement and up, down and vertically stable movement. The outputs of these counters are fed to decoders 190, 290 whereupon a signal representative of the vertical movement and the horizontal movement for the cursor is fed over line 11 to the computer.

Block 300 includes the clock generating circuitry 310 and the state counter and control signal generator 320 for generating signals for controlling the various elements in blocks 100 and 200 as will be described hereinafter.

In order to simplify the description and the understanding of the circuitry in accordance with the present invention, the construction and function of the present invention will be described with regard to the horizontal sensing circuitry 100 and the control and clock signal generating circuitry 300. It is understood that the various elements described with regard to the horizontal sensing and signal processing are equally applicable to that for vertical motion sensing and signal processing.

FIG. 3 illustrates the function circuit equivalents for the 64 horizontal sensors 110 and their associated sense amplifiers and the 64 vertical sensors 210 and their associated sense amplifiers. As can be seen therein, these 64 optical sensors produce light sensor outputs H1-H64 and V1-V64 and for the sake of simplicity, only the processing of signals H1-H64 will be described in detail.

A key feature of the present invention is the way in which the photosensor outputs H1-H64 are processed for object detection as will be described with respect to FIG. 4.

Because the signal conditioners are inverting, the outputs H1-H64 are normally at logic 0 when the light sensors are precharged. Precharging occurs periodically at a given time defined by a signal PRCH which will be explained hereinafter.

The outputs H1-H64 are applied to the Next State Latches 120 which are, in actuality, four groups 121-124 of 16 D-type flip-flops.

The object detecting circuitry 150 in accordance with the present invention comprises four groups 151-154 of 13 four input NOR gates whose outputs are OR'ed together, inverted and applied to the clock input for each group 121-124 of Next State Latches.

Each four input NOR gate is receptive of the outputs of four adjacent sensors and moreover, each group of 13 NOR gates is independent of the other groups.

The outputs of all of the NOR gates are at a logic 1 upon the precharging of the sensors. The object sensing circuitry for each group 121-124 of latches in effect senses the first group of four inputs which go to a logic 1, that is, their associated sensors sense the brightest background or "white" spot on the surface. At this point, that particular NORgate has its output go to logic 0 whereupon the input to the clock of the associated group 121-124 of latches 121-124 will latch the state of all of the sensors at that given time. Thus a separate object signal ODETECT will be produced for each group 121-124 of 16 latches. Moreover, it is not necessary that the object detect signal occur simultaneously for the four groups, since this depends upon the relative brightness of the background at the location of the associated sensors.

The state clocked into each of the set of 16 latches 121-124 constitutes the next state and is thereafter represented by outputs Q1-Q64. This state is held in latches 121-124 until the next period.

It should be noted that the separation of the four groups of 16 sensors outputs is maintained throughout all of the processing of the signals as can be seen in FIG. 5 which shows the connection of the outputs Q1-Q64 to the New State Latches 130 which consists of four groups 131-134 of 16 latches and the Old State Latches 140 which consists of four sets 141-144 of 16 latches.

Latches 131-134 and 141-144 are preferably D-type flip-flops. Latches 131-134 receive inputs Q1-Q64 and have as their outputs R1-R64 which are directly applied to latches 141-144 whose outputs are represented by signals S1-S64.

New State Latches 131-134 store the state of the sensor outputs Q1-Q64 upon an object detection signal, from the previous cycle by the use of the NLATCH signal whose timing will be explained hereinafter. Thus the object detection which occurs during each period after the sensors have been precharged, does not effect the motion detection processing that takes place since this processing relates to the state latched during the last period.

The new state held in latches 131-134 is updated at the end of each period by the NLATCH signal, however, outputs R1-R64 are only latched into Old State Latches 141-144 upon the determination of movement by the signal processing circuitry. This movement is indicated by the MDETECT signal.

Figure 6:
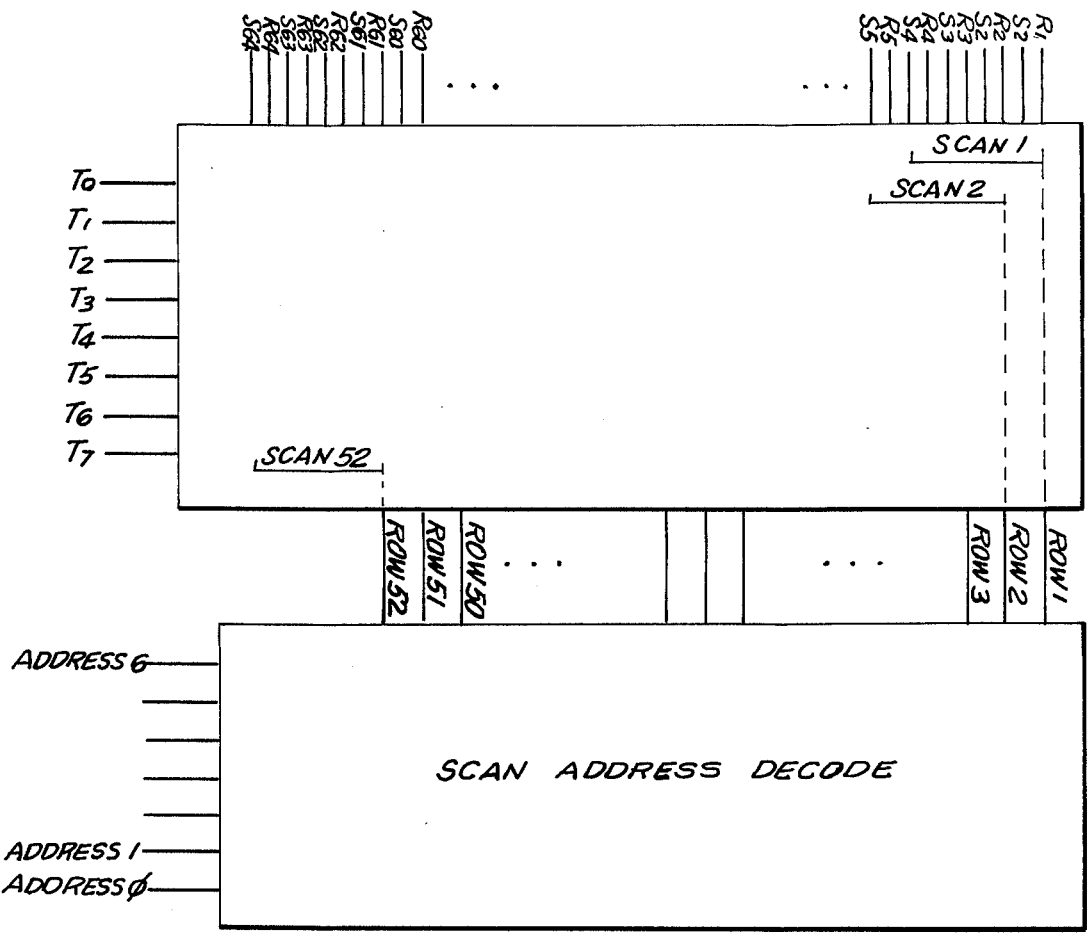
FIG. 6 is a schematic representation of the scanner circuitry shown in FIG. 2.
Figure 7:
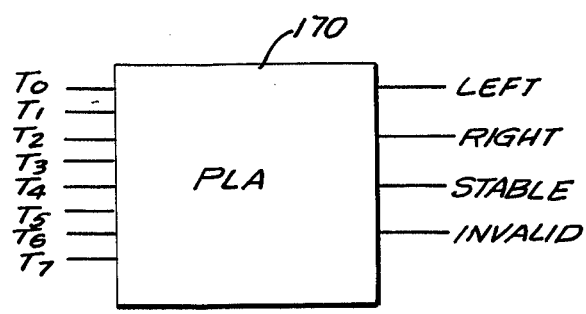
FIG. 7 is a block diagram of the PLA of FIG. 2.

The scanning circuitry 160 for comparing the new state stored in the 64 New State Latches and the old state stored in the 64 Old State Latches 140 is shown in FIG. 6. As shown therein, the scanning is carried out by moving a window across a group of four adjacent outputs of the signals R1-R64 and S1-S64.

The particular window to be used is controlled by signals ADDRESS0 to ADDRESS6 shown in FIG. 6. The Scan Address Decode logic is implemented with a NOR gate 1-of-N demultiplexer, though this method is not unique. The ADDRESS0-6 inputs are generated by the Control Signal Generator Block, 320 of block 300, in FIG. 2.

As has been explained heretofore, the separation of the four groups of 16 outputs is maintained in the scanner 160. As a result, each group of outputs R1-R16, R17-R32, R33-R48 and R49-R64 and likewise for S1-S64 are scanned in 13 steps so that in all there are 52 scans of the signals R1-R64. Each of the 52 scans generates outputs T0-T3 corresponding to the four signals looked at from R1-R64 and signals T4-T7 which correspond to the four signals looked at from signals S1-S64.

Figure 8:
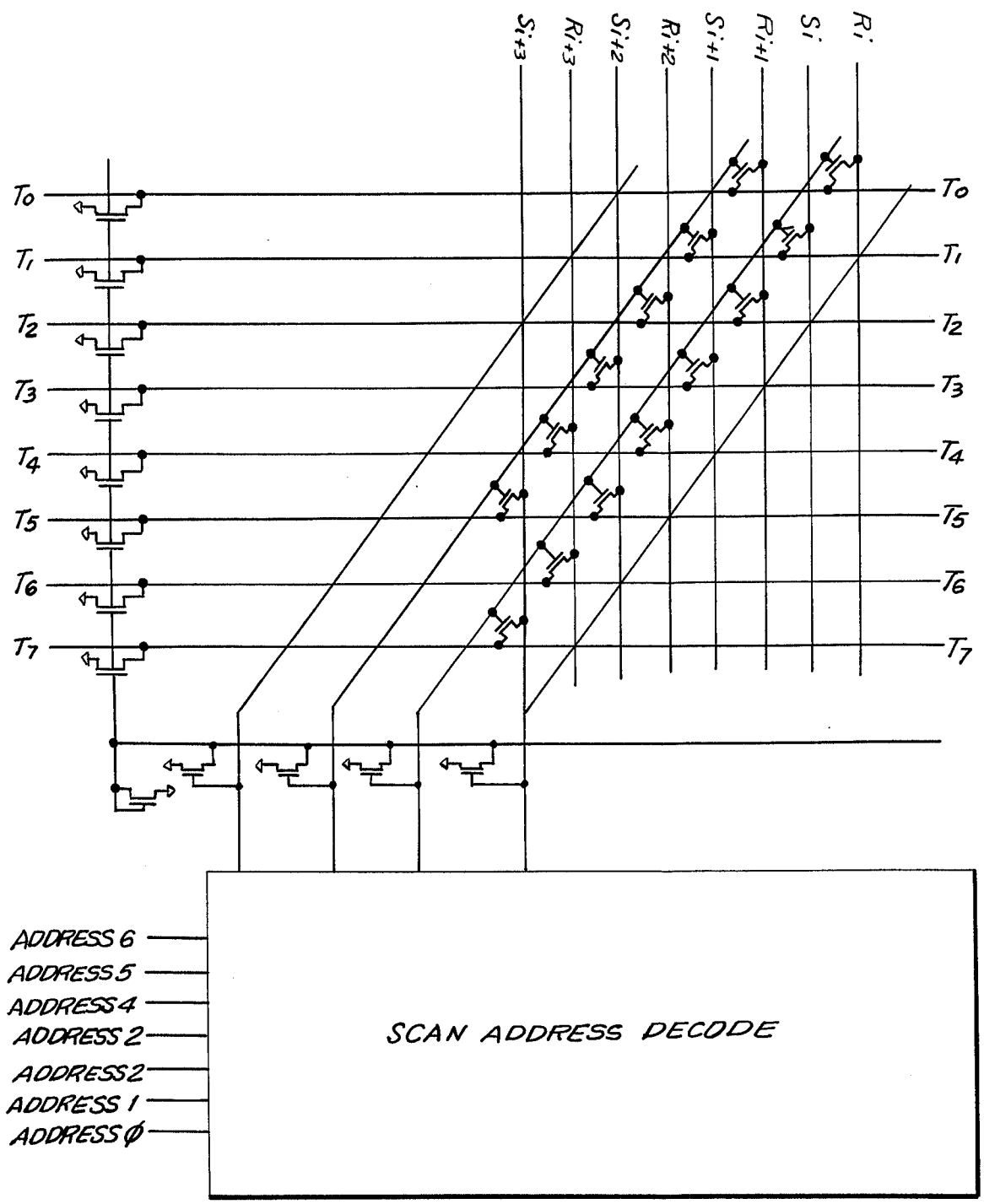
FIG. 8 is a schematic of the scan circuit of FIG. 6.

The implementation for the scan circuit is shown in FIG. 8. FIG. 8 shows only 4 of the 52 possible windows that must be scanned during each major cycle. Only 4 new-state-latch outputs (R[i] through R[i+3]) and only 4 old-state-latch outputs (S[i] through R[i+3])

The outputs T0-T7 are applied to the programmed logic array 170 which has stored therein an algorithm for detecting left, right, stable and hold outputs. These correspond to up, down, stable and invalid movements for the vertical circuitry. Invalid movement (hold output from the programmed logic array 270) causes no counter to be incremented or decremented. Valid initial states are all binary states that do not have imbedded zeroes (white areas). The sensor states are latched by a 3-wide white region within a group of 16 sensors, so theoretically no double or single wide zeroes can occur. This allows some insensitivity to noise.

Filling of the state after shifting right/left is determined by the bit at the ends of the 4-bit window (1000 would have 1 fill for shift right and 0 fill for shift left). This type of filling is assuming that the objects (either white or dark, in this case) are always wider than the window, by at least one bit. Other types of fill are possible, but most require many more product terms in the PLA without a large gain in movement detection.

These are the only states that can move. All other states can have stable transitions only.

```
0000
1111
1110
1100
1000
0111
0011
0001
0100
1001
0010
```

1110
The 0 of the state (in above) represents a white area on surface (discharged sensor). The above initial states are allowing noisy white objects to be tracked, see above 0100 state, for example, has one dark bit as noise, but one still wants to see it as moving if next state is 0010. The general algorithm for determining movement is derived from the state listings shown in Table I which includes all of the possible states and the movement that can be derived therefrom. All of the states possible for an inplementation of the move-pla is generated using all possible initial states of a 4-bit wide windows (16 states). Possible motions are stable, right, and left with fills at the edges of either 0 or 1. The fill for the 0 and 15. States can only be 1 or 0, respectively. Otherwise no motion would be seen (initial and final states would be the same). The numerical values are OCTAL bit codes. These are the states transitions for any of the 4-bit wide windows that are pass over the old-state-latch and new-state-latch arrays. The LSB of the octal bits values is on the bottom of a selected window, physically. This corresponds to the right side of the scanner for the vertical sensor block with the sensors oriented on the left. RIGHT and UP are synonomous, as are LEFT and DOWN.

TABLE I

PLA program states, format = (INITIAL-STATE/OLD-STATE, NEXT-STATE/NEW STATE, DIRECTION)

| (17, | 17, | HOLD) | (4, | 4, | STABLE) |
|---|---|---|---|---|---|
| (17, | 7, | LEFT) | (4, | 12, | LEFT) |
| (17, | 16, | RIGHT) | (4, | 2, | LEFT) |
| (16, | 16, | STABLE) | (4, | 11, | RIGHT) |
| (16, | 17, | LEFT) | (4, | 10, | RIGHT) |
| (16, | 7, | LEFT) | (3, | 3, | STABLE) |
| (16, | 15, | RIGHT) | (3, | 11, | LEFT) |
| (16, | 14, | RIGHT) | (3, | 1, | LEFT) |
| (15, | 15, | STABLE) | (3, | 7, | RIGHT) |
| (15, | 16, | LEFT) | (3, | 6, | RIGHT) |
| (15, | 6, | LEFT) | (2, | 2, | STABLE) |
| (15, | 13, | RIGHT) | (2, | 11, | LEFT) |
| (15, | 12, | RIGHT) | (2, | 1, | LEFT) |
| (14, | 14, | STABLE) | (2, | 5, | RIGHT) |
| (14, | 16, | LEFT) | (2, | 4, | RIGHT) |
| (14, | 6, | LEFT) | (1, | 1, | STABLE |
| (14, | 11, | RIGHT) | (1, | 10, | LEFT) |
| (14, | 10, | RIGHT) | (1, | 0, | LEFT) |
| (13, | 13, | STABLE) | (1, | 3, | RIGHT) |
| (13, | 15, | LEFT) | (1, | 2, | RIGHT) |
| (13, | 5, | LEFT) | (0, | 0, | HOLD) |
| (13, | 7, | RIGHT) | (0, | 10, | LEFT) |
| (13, | 6, | RIGHT) | (0, | 1, | RIGHT) |
| (12, | 12, | STABLE) | | | |
| (12, | 15, | LEFT) | | | |
| (12, | 5, | LEFT) | | | |
| (12, | 5, | RIGHT) | | | |
| (12, | 4, | RIGHT) | | | |
| (11, | 11, | STABLE) | | | |
| (11, | 14, | LEFT) | | | |
| (11, | 4, | LEFT) | | | |
| (11, | 3, | RIGHT) | | | |
| (11, | 2, | RIGHT) | | | |
| (10, | 10, | STABLE) | | | |
| (10, | 14, | LEFT) | | | |
| (10, | 4, | LEFT) | | | |
| (10, | 1, | RIGHT) | | | |
| (10, | 0, | RIGHT) | | | |
| (7, | 7, | STABLE) | | | |
| (7, | 13, | LEFT) | | | |
| (7, | 3, | LEFT) | | | |
| (7, | 17, | RIGHT) | | | |
| (7, | 16, | RIGHT) | | | |
| (6, | 6, | STABLE) | | | |
| (6, | 13, | LEFT) | | | |
| (6, | 3, | LEFT) | | | |
| (6, | 15, | RIGHT) | | | |
| (6, | 14, | RIGHT) | | | |

TABLE I-continued

PLA program states, format = (INITIAL-STATE/OLD-STATE, NEXT-STATE/NEW STATE, DIRECTION)

| (5, | 5, | STABLE) |
|---|---|---|
| (5, | 12, | LEFT) |
| (5, | 2, | LEFT) |
| (5, | 13, | RIGHT) |
| (5, | 12, | RIGHT) |

Table II shows bits which represent the actual coding, so the AND plane has the inputs twisted in pairs. The OR plane columns are (left to right) UP, STABLE HOLD, DOWN. A 0 for these bits becomes an output of 1 from the PLA. Actual PLA outputs have these bit order twisted in pairs and so are (left to right) STABLE/, UP/, DOWN/, HOLD/.

TABLE II

| (00000000) | (0000) | | |
|---|---|---|---|
| (10000000) | (1110) | (10011111) | (1110) |
| (00000010) | (0111) | (10111101) | (0111) |
| (00000011) | (1011) | (10111111) | (0111) |
| (00000001) | (1110) | (11000000) | (1011) |
| (10000001) | (1110) | (01100000) | (1110) |
| (00001001) | (0111) | (11100000) | (1110) |
| (00001011) | (0111) | (01000000) | (0111) |
| (00001100) | (1011) | (01000010) | (0111) |
| (00000110) | (1110) | (11000011) | (1011) |
| (10000110) | (1110) | (01100001) | (1110) |
| (00100100) | (0111) | (11100001) | (1110) |
| (00100110) | (0111) | (01001001) | (0111) |
| (00001111) | (1011) | (01001011) | (0111) |
| (00000111) | (1110) | (11001100) | (1011) |
| (10000111) | (1110) | (01100110) | (1110) |
| (00101101) | (0111) | (11100110) | (1110) |
| (00101111) | (0111) | (01100100) | (0111) |
| (00110000) | (1011) | (01100110) | (0111) |
| (00011000) | (1110) | (11001111) | (1011) |
| (10011000) | (1110) | (01100111) | (1110) |
| (10010000) | (0111) | (11100111) | (1110) |
| (10010010) | (0111) | (01101101) | (0111) |
| (00110011) | (1011) | (01101111) | (0111) |
| (00011001) | (1110) | (11110000) | (1011) |
| (10011001) | (1110) | (01111000) | (1110) |
| (10011001) | (0111) | (11111000) | (1110) |
| (10011011) | (0111) | (11010000) | (0111) |
| (00111100) | (1011) | (11010010) | (0111) |
| (00011110) | (1110) | (11110011) | (1011) |
| (10011110) | (1110) | (01111001) | (1110) |
| (10110100) | (0111) | (11111001) | (1110) |
| (10110110) | (0111) | (11011001) | (0111) |
| (00111111) | (1011) | (11011011) | (0111) |
| (00011111) | (1110) | (11111100) | (1011) |
| | | (01111110) | (1110) |
| | | (11111110) | (1110) |
| | | (11110100) | (0111) |
| | | (11110110) | (0111) |
| | | (11111111) | (0000) |
| | | (01111111) | (1110) |
| | | (11111101) | (0111) |

Table III shows an abridged form of the state listing of Table I and that is commercially preferable due to the limitations in memory space in the device. Accordingly, only the states shown therein are stored and it is understood that any other values not shown in the table constitute invalid data and thus would not indicate movement. Table IV shows the bits corresponding to Table III.

TABLE III

| (17, | 17, | HOLD) |
|---|---|---|
| (17, | 7, | LEFT) |
| (17, | 16, | RIGHT) |
| (16, | 16, | STABLE) |
| (16, | 17, | LEFT) |

TABLE III-continued

| | | |
|---|---|---|
| (16, | 14, | RIGHT) |
| (15, | 15, | STABLE) |
| (14, | 14, | STABLE) |
| (14, | 16, | LEFT) |
| (14, | 10, | RIGHT) |
| (13, | 13, | STABLE) |
| (12, | 12, | STABLE) |
| (11, | 11, | STABLE) |
| (10, | 10, | STABLE) |
| (10, | 14, | LEFT) |
| (10, | 1, | RIGHT) |
| (10, | 0, | RIGHT) |
| (7, | 7, | STABLE) |
| (7, | 3, | LEFT) |
| (7, | 17, | RIGHT) |
| (6, | 6, | STABLE) |
| (6, | 3, | LEFT) |
| (6, | 14, | RIGHT) |
| (5, | 5, | STABLE) |
| (4, | 4, | STABLE) |
| (4 | 2, | LEFT) |
| (4, | 10, | RIGHT) |
| (3, | 3, | STABLE) |
| (3, | 1, | LEFT) |
| (3, | 7, | RIGHT) |
| (2, | 2, | STABLE) |
| (2, | 1, | LEFT) |
| (2, | 4, | RIGHT) |
| (1, | 1, | STABLE) |
| (1, | 10, | LEFT) |
| (1, | 0, | LEFT) |
| (1, | 3, | RIGHT) |
| (0, | 0, | HOLD) |
| (0, | 10, | LEFT) |
| (0, | 1, | RIGHT)) |

TABLE IV

| | |
|---|---|
| (00000000) | (0000 |
| (10000000) | (1110) |
| (00000010) | (0111) |
| (00000011) | (1011) |
| (00000001) | (1110) |
| (00001011) | (0111) |
| (00001100) | (1011) |
| (00001111) | (1011) |
| (00000111) | (1110) |
| (00101111) | (0111) |
| (00110000) | (1011) |
| (00110011) | (1011) |
| (00111100) | (1011) |
| (00111111) | (1011) |
| (00011111) | (1110) |
| (10111101) | (0111) |
| (10111111) | (0111) |
| (11000000) | (1011) |
| (11100000) | (1110) |
| (01000000) | (0111) |
| (11000011) | (1011) |
| (11100001) | (1110) |
| (01001011) | (0111) |
| (11001100) | (1011) |
| (11001111) | (1011) |
| (11100111) | (1110) |
| (01101111) | (0111) |
| (11110000) | (1011) |
| (11111000) | (1110) |
| (11010000) | (0111) |
| (11110011) | (1011) |
| (11111001) | (1110) |
| (11011011) | (0111) |
| (11111100) | (1011) |
| (01111110) | (1110) |
| (11111110) | (1110) |
| (11110100) | (0111) |
| (11111111) | (0000) |
| (01111111) | (1110) |
| (11111101) | (0111) |

The outputs from the PLA 170 are fed to up-down counters 181–183. Each time the algorithm in the PLA 170 indicates motion to the left, a pulse signal is produced therefrom and it counts the left counter 181 up and counts down the right counter 182 and the stable counter 183. After the end of the 52 scans, decoder 190 determines which of the three counters 181-183 has the highest value and that is the one which determines whether there has been movement left, right or stable (no movement). The quadrature signal from the decoder 190 and decoder 290 are fed to the computer with a signal which is compatible therewith and which is similar to those generated by mechanical mouse devices or other optical mouse devices. If the decoder 190 detects movement left or right, it generates the OLATCH signal which, before the next state Q1–Q64 is latched into the New State Latches 130 by the ENDS signal, the new state R1–R64 is latched into Old State Latches 140 by the OLATCH signal. On the other hand, if no motion has been detected, Old State Latches 140 will remain in the same state and will be compared to the next state after it has been latched into New State Latches 130 by the ENDS signal.

Should the old-state-latch arrays, blocks 140 and 240, become a state that would allow movement to never be detected, the ship would enter the lost state it could never leave. The Control Signal Generator block, 320, contains a timer cirucit to detect this state and force an OLATCH signal to take place, thereby returning the chip to a known image state.

Figure 9:
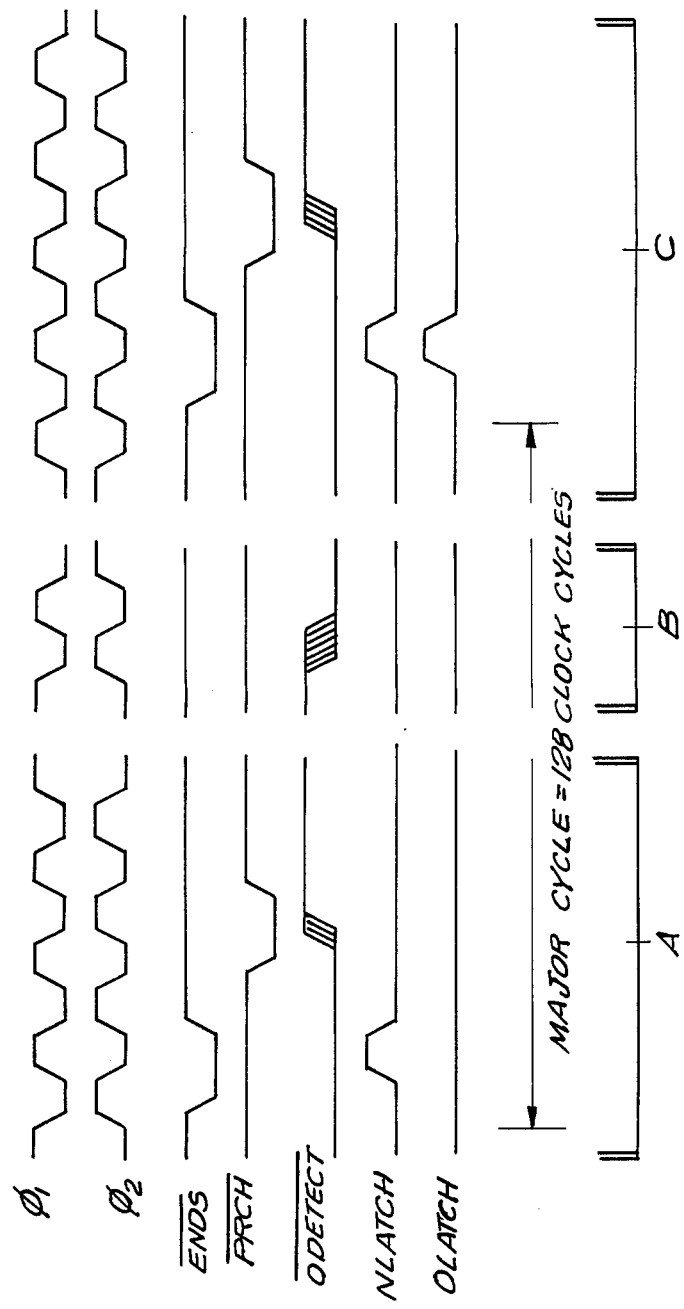
FIG. 9 is a major cycle timing diagram.
Figure 10:
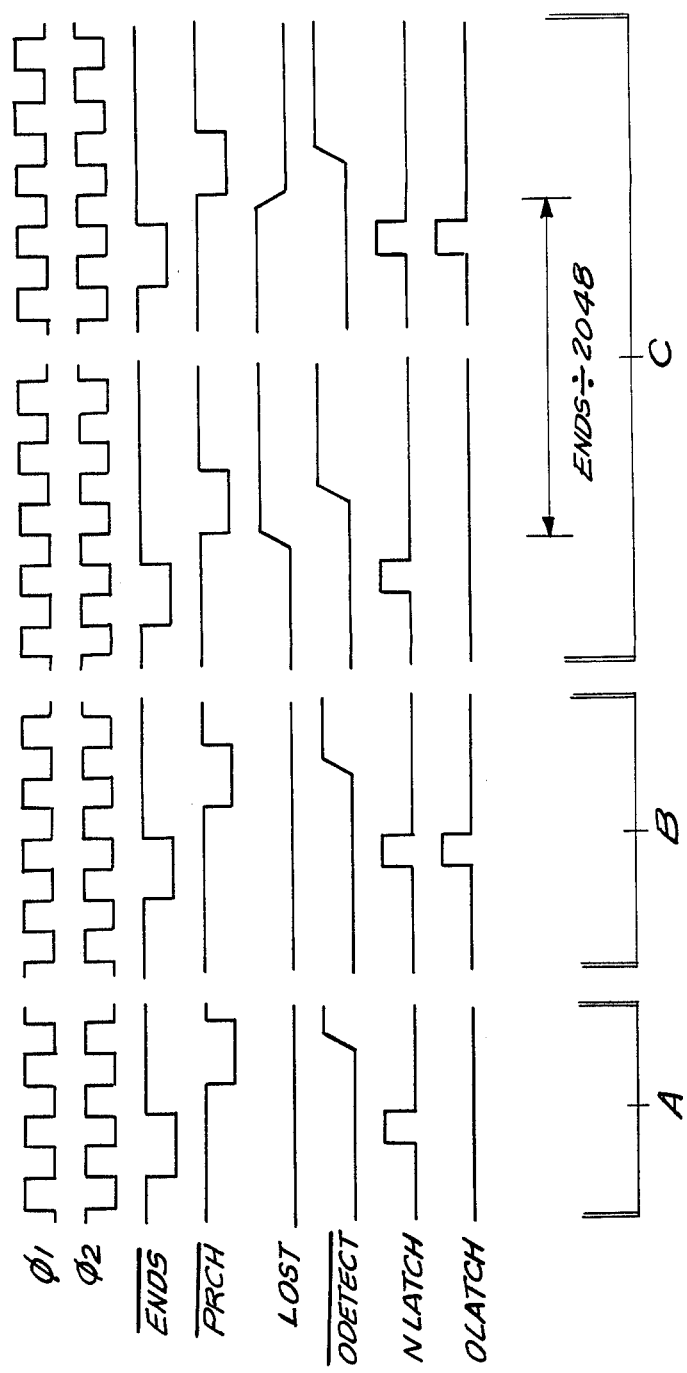
FIG. 10 is a system edge timing diagram.

FIGS. 9–10 show the timing as carried out in accordance with the present invention. The timing signals $\phi 1$, $\phi 2$, ENDS, PRCH, ODETECT, LOST, NLATCH and OLATCH are all generated by the clock generator 310 and the state counter and control signal generator 320 of block 300 in FIG. 2.

$\phi 1$ and $\phi 2$ are clock driven signals and are used to generate the other timing signals for the system. The relative edge timing of these signals is clearly shown in FIG. 12 and the generation thereof is well known to those skilled in the art.

The PRCH signal is a single clock pulse wide strobe which is used to precharge the sensors. This signal is generated for every 128 clock cycles and this defines a major clock cycle as shown in FIG. 9.

The ENDS signal is a single clock cycle wide strobe which transfers the new state to the old state latches. It also latches the result of the movement as indicated by the end detect signal shown in FIG. 9.

The object detect signal is generated by the object detect circuitry 150, 250 as has been explained and its edge timing relative to the other signals is clearly shown in FIG. 10. The scan signal noted in FIG. 10 merely is shown to indicate the time period in which scanning takes place which is 52 clock cycles wide and which encompasses the time in which the PRCH signal is generated as well as the time during which the object detection is carried out.

Referring to FIG. 9, major cycle timing includes region "A" which is the start of a major cycle of 128 clock cycles. NLATCH transfers the new-state sensor-latch outputs to the New-State latches. This strobe occurs every ENDS low strobe. The ODETECT signal latches the analog sensor values into the Next-State latches when ODETECT goes low (not shown). This signal is reset at the beginning of every major cycle (when PRCH goes low). In region "B", sometime during the major cycle, the ODETECT signal goes low, latching the sensor states. In region "C", if movement has been detected by the PLA scanning and counting during the previous major cycle, then OLATCH will go low, transferring the New-State latch values to the Old-State latches. This strobe will also occur if the LOST signal is true.

Referring to FIG. 10, the system timing is shown as consisting of three regions as follows:

A. Normal end of major cycle timing. Stable or random movement was detected during previous major cycle. ODETECT is reset during PRCH strobe. NLATCH, only, is strobed. There is no LOST pulse during ENDS strobe.

B. Normal end of major cucle timing. Valid movement was detected during previous major cycle. OLATCH and NLATCH both are strobed since movement was detected. ODETECT is reset during normal PRCH strobe.

C. Timing of LOST strobe. There are 2048 ENDS strobes between LOST cycle time (LOST is ENDS/2048). At the end of the LOST cycle timing, if no valid movement had been detected during the previous 2048 major cycles, then the LOST stobe will occur. ODETECT occurs normally, regardless of the LOST timing, and is reset during the PRCH strobe.

It will be appreciated that the instant specification and claims are set forth by way of illustration and not limitation, and that various modifications and changes may be made without departing from the spirit and scope of the present invention.

What is claimed is:

1. In a device for controlling the position of a visual display cursor, wherein the device is movable in a plane defined by two non-parallel axes and having a surface pattern of relatively light and dark areas separated by optical edges and having means responsive to the motion of the device on the surface pattern relative to the two non-parallel axes to produce signals representing a direction of motion for the cursor, the improvement wherein the means comprises:

means for optically sensing the surface pattern comprising a plurality (N) of prechargeable photon sensors disposed in a single row along each axis, means for periodically sensing the presence of an edge in at least one preselected portion of each row of sensors to define a sensor state for each axis for each period, comprising means for precharging the sensors every period and object detecting means for storing the state of each of P groups of Q sensors in each period, where $P \times Q = N$, when R adjacent sensors in each of the P groups discharge below a given threshold and where $R < Q$ and motion detecting means for each axis and independent of the other axis for determining if movement has occurred relative to each axis and comprising means for scanning the state of each set of S adjacent sensors in each of the P groups of Q sensors where $S < Q$, means for comparing the sets of adjacent sensors for successive states and means for producing a separate direction signal for each axis from the comparisons.

2. The device according to claim 1, wherein the means for periodically sensing comprises first latching means for each axis for storing the output of the sensors upon the sensing of the presence of an edge of define a next state of the sensors and wherein the comparing means for each axis comprises second latching means for storing a last state of the sensors, third latching means for storing an old state of the sensors, means receptive of the last state and the old state for determining if movement has occurred, means for entering the last state from the second latching means into the third latcing means in each period upon the determination of movement and for entering the next state from the first latching means into the second latching means in each period.

3. The device according to claim 2, wherein the optical sensing means comprises means for digitizing the output of each sensor, wherein the first latching means comprises N first latches, and wherein the object detecting means comprises means receptive of the outputs of the sensors in P groups of Q outputs, means for producing a group latch signal for each group when the first set of outputs of any R adjacent sensors in that group indicate that the sensors have discharged below a given threshold and means for applying the group latch signal to the group of Q first latches associated therewith in the first latching means to store the next state data that is at the inputs thereof.

4. The device according to claim 3, wherein the means for producing the group latch signal comprises $(Q-R+1)$ OR-gates each having R inputs and wherein all of the inputs of the OR gates are OR'ed together and wherein the latches of the first latching means comprise D-type flip-flops.

5. The device according to claim 3, wherein the second and third latching means comprises N latches in P groups of Q each, with each group corresponding to one of the groups of the first latching means and wherein the means for scanning comprises means for scanning each corresponding set of S adjacent outputs in each group of Q latches of the second and third latching means and means for analyzing each scan in accordance with a predetermined algorithm.

6. The device according to claim 5, wherein the analyzing means comprises a programmed logic array having the algorithm stored therein.

7. The device according to claim 5, wherein the means for producing a direction signal comprises for each axis three up/down counters including a first counter for movement in one direction, a second counter for movement in another direction opposite said one direction and a third counter for no movement, means for up-counting one of the three counters for each scan upon the favorable determination of movement in that direction by the algorithm and for down counting the other two counters and means for producing a direction signal corresponding to the counter having a count higher than the count of the other two counters.

8. The device according to claim 1, further comprising a housing for the optical sensing means, the housing having a base disposable on the surface pattern including an imaging aperture, the optical sensing means comprises an integrated circuit having the photon sensors thereon, means mounting the integrated circuit in a direct path with the imaging aperture.

9. The device according to claim 8, further comprising a compound lens disposed between the imaging aperture and the integrated circuit.

10. The device according to claim 8, further comprising a fiber-optic bundle disposed between the imaging aperture and the integrated circuit.

11. A method for converting movement of an object in a plane, defined by two non-parallel axes and having a surface pattern of relatively light and dark areas separated by optical edges, to electrical signals representing a direction of motion relative to the two non-parallel axes, the method comprising the steps of:

disposing a plurality (N) of prechargeable photon sensors on the object in a single row along each axis and facing the surface pattern, periodically sensing the presence of an edge in at least one preselected portion of each row of sensors by precharging the sensors every period and detecting an object by storing the state of each of P groups of Q sensors in each period, where $P \times Q = N$, when R adjacent sensors in each of the P groups discharge below a given threshold and where $R < Q$, defining a sensor state for each axis for each period upon the sensing of the presence of an edge, and detecting motion relative to each axis independent of the other axis and producing a direction signal for each axis representative of the movement determined by scanning the state of each set of S adjacent sensors in each of the P groups of Q sensors where $S < Q$, comparing the sets of adjacent sensors for successive states and producing the direction signal for each axis from the comparisons.

12. The method according to claim 11, wherein the step of periodically sensing comprises latching an output of the sensors for each axis upon the sensing of the presence of an edge to define a next state of the sensors and wherein the step of comparing comprises latching a last state of the sensors for each axis, latching an old state of the sensors, scanning the latched last state and the latched old state to determine if movement has occurred, entering the last state into the old state latched in each period upon the determination of movement and entering the next state into the last state latch in each period.

13. The method according to claim 12, wherein the step of sensing comprises digitizing the output of each sensor, providing N next state latches, and wherein the step of object detecting comprises dividing the outputs of the sensors in each axis into P groups of Q outputs, producing a group latch signal for each group when the first set of outputs of any R adjacent sensors in that group indicate that the sensors have discharged below a given threshold, and applying the group latch signal to the group of Q next state latches associated therewith to store the next state data that is at the inputs thereof.

14. The method according to claim 13, wherein the step of producing the group latch signal comprises logically ORing each set of R adjacent outputs in each group in parallel and logically ORing the outputs thereof.

15. The method according to claim 13, wherein the step of scanning comprises scanning each corresponding set of S adjacent outputs in each group of Q latches of the last state and old state latches and analyzing each scan in accordance with a predetermined algorithm.

16. The method according to claim 15, wherein the step of producing a movement signal comprises providing three up/down counters for each axis including a first counter for movement in one direction, a second counter for movement in another direction opposite said one direction and a third counter for no movement, up-counting one of the three counters for each scan upon the favorable determination of movement in a corresponding direction and down counting the other two counters and producing a direction signal for each axis corresponding to the counter having a count higher than the count in the other two counters.

17. The device according to claim 1, further comprising a housing for the optical sensing means, the housing having a base disposable on the surface pattern including an imaging aperture, wherein the optical sensing means comprises an integrated circuit having the photon sensors thereon and means mounting the integrated circuit in a direct linear path with the imaging aperture and a fiber-optic bundle disposed between the imaging aperture and the integrated circuit.

* * * * *

UNITED STATES PATENT AND TRADEMARK OFFICE
CERTIFICATE OF CORRECTION

PATENT NO. : 4,799,055

DATED : Jan. 17, 1989

INVENTOR(S) : Nestler et al.

It is certified that error appears in the above-identified patent and that said Letters Patent is hereby corrected as shown below:

| | |
|---|---|
| Title Page, under "U.S. Patent Documents", line 16 | Correct date --12/86-- |
| Col. 1, line 9 | Delete "moe" and substitute --more-- |
| Col. 1, line 12 | Delete "user" and substitute --use-- |
| Col. 3, line 58 | Delete "comprising" and substitute --comprises-- |
| Col. 4, line 38 | Insert --)-- after "above" |
| Col. 7, line 40 | Insert --detect-- after "object" |
| Col. 8, line 27 | Insert --and S1-S64-- after "R64" |
| Col. 11, line 34 | Insert --)-- after "(0000" |
| Col. 13, line 64 | Delete "of" in third instance and substitute --to-- |

Signed and Sealed this

Twenty-first Day of November, 1989

*Attest:*

JEFFREY M. SAMUELS

*Attesting Officer*   *Acting Commissioner of Patents and Trademarks*